(12) United States Patent
Morikazu et al.

(10) Patent No.: US 8,513,566 B2
(45) Date of Patent: Aug. 20, 2013

(54) LASER BEAM PROCESSING MACHINE

(75) Inventors: Hiroshi Morikazu, Tokyo (JP); Keiji Nomaru, Tokyo (JP)

(73) Assignee: Disco Corporation, Tokyo (JP)

( * ) Notice: Subject to any disclaimer, the term of this patent is extended or adjusted under 35 U.S.C. 154(b) by 1346 days.

(21) Appl. No.: 11/979,936

(22) Filed: Nov. 9, 2007

(65) Prior Publication Data

US 2008/0110868 A1 May 15, 2008

(30) Foreign Application Priority Data

Nov. 15, 2006 (JP) .................................. 2006-309176

(51) Int. Cl.
*B23K 26/02* (2006.01)
*B23K 26/38* (2006.01)

(52) U.S. Cl.
USPC .............. 219/121.7; 219/121.75; 219/121.77; 250/205; 372/9

(58) Field of Classification Search
USPC ............. 219/121.63–121.72, 121.76, 121.77, 219/121.75; 372/13, 29.01, 9; 250/205
See application file for complete search history.

(56) References Cited

U.S. PATENT DOCUMENTS

| | | | | |
|---|---|---|---|---|
| 4,083,629 A | * | 4/1978 | Kocher et al. ............... | 359/226.1 |
| 6,433,489 B1 | * | 8/2002 | Tanaka et al. ............... | 315/169.4 |
| 6,621,044 B2 | * | 9/2003 | Jain et al. .................... | 219/121.7 |
| 6,624,382 B2 | * | 9/2003 | Kling ........................ | 219/121.67 |
| 6,639,179 B2 | * | 10/2003 | Vogler et al. ............. | 219/121.71 |
| 7,333,255 B2 | * | 2/2008 | Eda et al. .................... | 359/196.1 |
| 7,385,157 B2 | * | 6/2008 | Oda et al. ................. | 219/121.63 |
| 7,425,471 B2 | * | 9/2008 | Bruland et al. ............... | 438/130 |
| 2006/0205121 A1 | * | 9/2006 | Couch et al. .................. | 438/129 |
| 2007/0138156 A1 | | 6/2007 | Nomaru et al. | |

FOREIGN PATENT DOCUMENTS

| | | | |
|---|---|---|---|
| JP | 09052188 A | * | 2/1997 |
| JP | 2000202671 A | * | 7/2000 |
| JP | 2003-163323 | | 6/2003 |
| JP | 2003285183 A | * | 10/2003 |
| JP | 2006-255761 | | 9/2006 |
| JP | 2007-1603374 | | 6/2007 |

* cited by examiner

*Primary Examiner* — Samuel M Heinrich
(74) *Attorney, Agent, or Firm* — Smith, Gambrell & Russell, LLP

(57) ABSTRACT

A laser beam processing machine comprising a laser beam application means for applying a laser beam to a workpiece held on a chuck table and a processing-feed means, wherein the laser beam application means comprises a first pulse laser beam application means and a second pulse laser beam application means; the first pulse laser beam application means comprises an acousto-optic deflection means for deflecting the optical axis of a pulse laser beam oscillated by a first pulse laser beam oscillation means in the processing-feed direction (X direction), and a first condenser lens for converging a pulse laser beam passing through the acousto-optic deflection means; the second pulse laser beam application means comprises a second condenser lens for converging a pulse laser beam oscillated by the second pulse laser beam oscillation means; and an NA value of the first condenser lens is set smaller than the NA value of the second condenser lens.

2 Claims, 9 Drawing Sheets

(a)

(b)

(c)

(a)

(b)

(a)

(b)

(a)

(b)

LASER BEAM PROCESSING MACHINE

FIELD OF THE INVENTION

The present invention relates to a laser beam processing machine for carrying out the laser processing of a workpiece such as a wafer and the like.

DESCRIPTION OF THE PRIOR ART

In the production process of a semiconductor device, a plurality of areas are sectioned by dividing lines called "streets" arranged in a lattice pattern on the front surface of a substantially disk-like semiconductor wafer, and a device such as IC or LSI is formed in each of the sectioned areas. Individual semiconductor chips are manufactured by cutting this semiconductor wafer along the streets to divide it into the areas each of which has a device formed thereon.

To reduce the size and increase the number of functions of an apparatus, a modular structure in which a plurality of semiconductor chips are laminated and electrodes of the laminated chips are connected, has been implemented. As disclosed by JP-A 2003-163323, this modular structure has such a structure that via holes reaching bonding pads are formed from the rear side at positions where the bonding pads in the front surface of the semiconductor wafer are formed and a conductive material such as aluminum that is to be connected to the bonding pads, is embedded in the via holes.

The via holes in the above semiconductor wafer are formed by a drill. However, the diameters of the via holes formed in the semiconductor wafer are as small as 100 to 300 μm and hence, formation of the via holes by drilling has such a problem as low productivity.

To solve the above problem, a laser beam processing machine capable of efficiently forming via holes in a workpiece such as a semiconductor wafer is disclosed by JP-A 2006-255761. This laser beam processing machine comprises a processing-feed amount detection means for detecting the relative processing feed amount of a laser beam application means to a chuck table for holding a workpiece, a memory means for storing the X and Y coordinate values of via holes to be formed in the workpiece and a control means for controlling the laser beam application means based on the X and Y coordinate values of via holes stored in the memory means and a detection signal from the processing-feed amount detection means, and is so designed as to apply one pulse of a laser beam when the point of the X and Y coordinate values of a via hole to be formed in the workpiece reaches a position right below the condenser of the laser beam application means.

To form a via hole in the workpiece, however, a pulse laser beam must be applied to the same position a plurality of times. When the above laser beam processing machine is used, the workpiece must be moved a plurality of times. Therefore, the above method is not always satisfactory in terms of productivity.

To cope with this demand, the assignee company of the present application has proposed as JP-A 2007-160374 a laser beam processing machine which comprises a laser beam application means having an acousto-optic deflection means comprising an acousto-optic device and applies a laser beam to the same position while moving the workpiece in the processing feed direction by deflecting the optical axis of a laser beam oscillated by a laser beam oscillation means at the time when it passes through the acousto-optic device.

In the above method of forming via holes by applying a laser beam from the rear surface of the semiconductor wafer, the application of the laser beam must be stopped so as not to make a hole in the bonding pads formed on the front surface of the semiconductor wafer. To this end, it is necessary to control the laser beam application means to apply a predetermined number of pulses of the laser beam so as to reach the bonding pad. However, in the laser beam application means for deflecting the optical axis of the laser beam by using the acousto-optic deflection means, an NA value of a condenser lens must be set to 0.1 or less in order to ensure a predetermined amount of displacement of the focal point of the laser beam whose optical axis has been deflected. When the NA value of the condenser lens is set to 0.1 or less, the focal distance of the condenser lens becomes long and the focal depth becomes large, thereby increasing the processable length of the laser beam. Consequently, when processing is carried out up to a position close to the bonding pad, a problem occurs that heat is accumulated and the temperature reaches the melting point of the bonding pad at the time when processing reaches the bonding pad, thereby melting the bonding pad.

SUMMARY OF THE INVENTION

It is an object of the present invention to provide a laser beam processing machine capable of forming via holes reaching bonding pads without melting the bonding pads and further, a wafer processing method capable of forming via holes efficiently by using this laser beam processing machine.

To attain the above object, according to the present invention, there is provided a laser beam processing machine comprising a chuck table for holding a workpiece, a laser beam application means for applying a laser beam to the workpiece held on the chuck table, and a processing-feed means for moving the chuck table and the laser beam application means relative to each other in a processing-feed direction (X direction), wherein the laser beam application means comprises a first pulse laser beam application means and a second pulse laser beam application means;

the first pulse laser beam application means comprises a first pulse laser beam oscillation means for oscillating a first pulse laser beam, an acousto-optic deflection means for deflecting the optical axis of a pulse laser beam oscillated by the first pulse laser beam oscillation means in the processing-feed direction (X direction), and a first condenser lens for converging the first pulse laser beam passing through the acousto-optic deflection means;

the second pulse laser beam application means comprises a second pulse laser beam oscillation means for oscillating a second pulse laser beam and a second condenser lens for converging the second pulse laser beam oscillated by the second pulse laser beam oscillation means; and an NA value of the first condenser lens is set smaller than the NA value of the second condenser lens.

Preferably, the NA value of the first condenser lens is set to 0.01 or less and the NA value of the second condenser lens is set to 0.02 or more.

Further, a shared pulse laser beam oscillation means serving as the first pulse laser beam oscillation means and the second pulse laser beam oscillation means is installed, and a route switching means for selectively switching a pulse laser beam oscillated from the shared pulse laser beam oscillation means between a first route and a second route is provided, the acousto-optic deflection means and the first condenser lens being installed in the first route and the second condenser lens being installed in the second route.

In the laser beam processing machine of the present invention, as the NA value of the first condenser lens constituting the first pulse laser beam application means is set smaller than the NA value of the second condenser lens constituting the second pulse laser beam application means, a predetermined amount of displacement of the focal point of the laser beam whose optical axis has been deflected by the acousto-optic deflection means can be secured. Therefore, a pulse laser beam can be applied to the same processing position while the chuck table holding the workpiece is moved in the processing-feed direction, thereby making it possible to form a laser-processed hole having a predetermined depth efficiently. Further, since the NA value of the second condenser lens constituting the second pulse laser beam application means is set to a large value, the focal depth is small and the processable length of the laser beam becomes small, thereby making it easy to control the amount of processing.

Therefore, to form a via hole reaching a bonding pad in the wafer by using the laser beam processing machine of the present invention, an incomplete via hole not reaching the bonding pad is formed by using the first pulse laser beam application means and then, a via hole reaching the bonding pad is formed by using the second pulse laser beam application means, thereby making it possible to form a via hole efficiently without melting the bonding pad.

DETAILED DESCRIPTION OF THE PREFERRED EMBODIMENT

A preferred embodiment of the present invention will be described in more detail with reference to the accompanying drawings.

Figure 1:
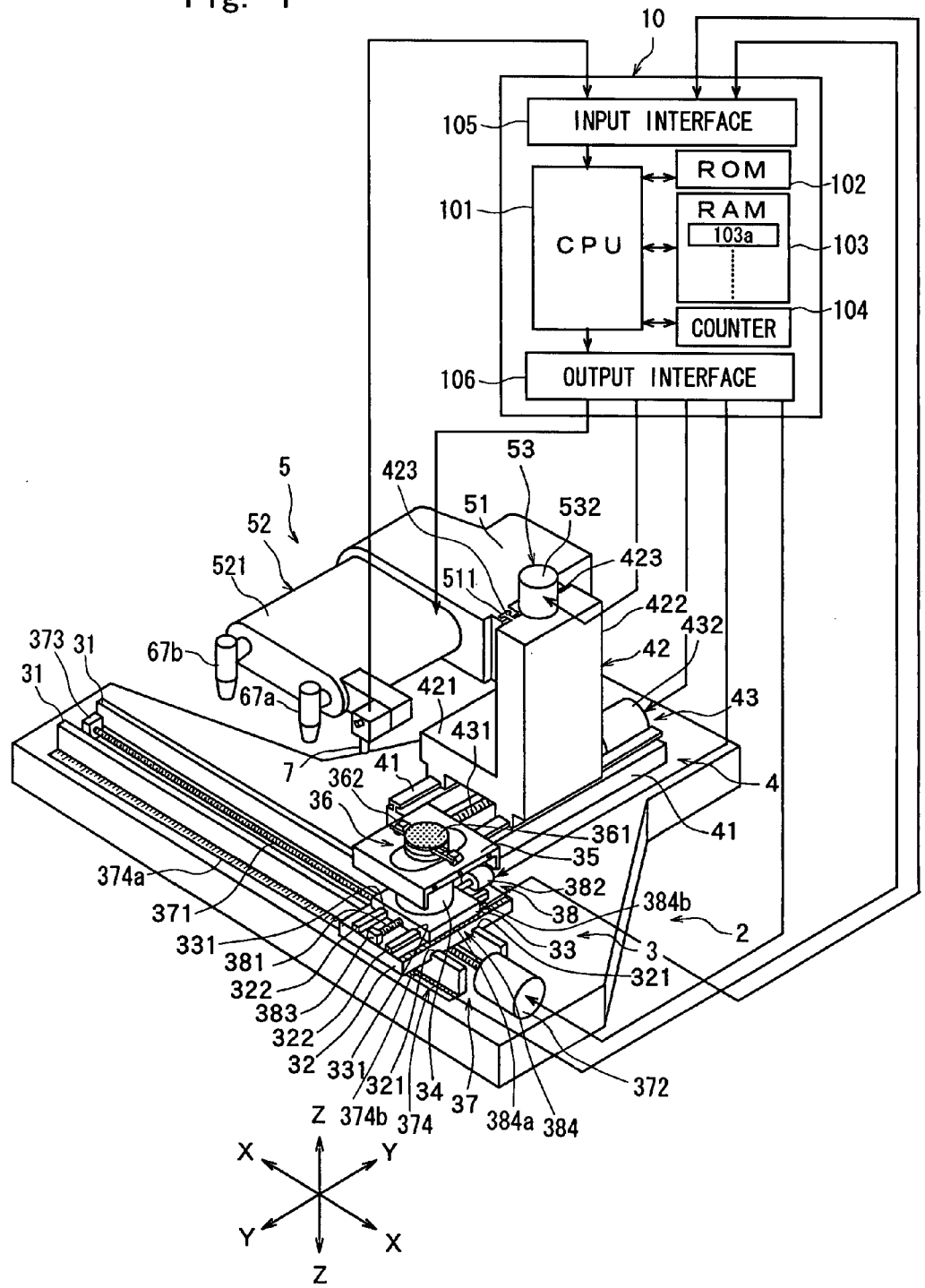
FIG. 1 is a perspective view of a laser beam processing machine constituted according to the present invention.

FIG. 1 is a perspective view of a laser beam processing machine constituted according to the present invention. The laser beam processing machine shown in FIG. 1 comprises a stationary base 2, a chuck table mechanism 3 for holding a workpiece, which is mounted on the stationary base 2 in such a manner that it can move in a processing-feed direction (X direction) indicated by an arrow X, a laser beam application unit support mechanism 4 mounted on the stationary base 2 in such a manner that it can move in an indexing-feed direction (Y direction) indicated by an arrow Y perpendicular to the processing-feed direction (X direction) indicated by the arrow X, and a laser beam application unit 5 mounted on the laser beam application unit support mechanism 4 in such a manner that it can move in a direction (Z direction) indicated by an arrow Z.

The above chuck table mechanism 3 comprises a pair of guide rails 31 and 31 which are mounted on the stationary base 2 and are arranged parallel to each other in the processing-feed direction (X direction) indicated by the arrow X, a first sliding block 32 mounted on the guide rails 31 and 31 in such a manner that it can move in the processing-feed direction (X direction) indicated by the arrow X, a second sliding block 33 mounted on the first sliding block 32 in such a manner that it can move in the indexing-feed direction (Y direction) indicated by the arrow Y, a cover table 35 supported on the second sliding block 33 by a cylindrical member 34, and a chuck table 36 as a workpiece holding means. This chuck table 36 comprises an adsorption chuck 361 made of a porous material, and a workpiece, for example, a disk-like semiconductor wafer is held on the adsorption chuck 361 by a suction means that is not shown. The chuck table 36 constituted as described above is rotated by a pulse motor (not shown) installed in the cylindrical member 34. The chuck table 36 is provided with clamps 362 for fixing an annular frame which will be described later.

The above first sliding block 32 has, on its undersurface, a pair of to-be-guided grooves 321 and 321 to be fitted to the above pair of guide rails 31 and 31 and has, on the top surface, a pair of guide rails 322 and 322 formed parallel to each other in the indexing-feed direction (Y direction) indicated by the arrow Y. The first sliding block 32 constituted as described above can move along the pair of guide rails 31 and 31 in the processing-feed direction (X direction) indicated by the arrow X when the to-be-guided grooves 321 and 321 are fitted to the pair of guide rails 31 and 31, respectively. The chuck table mechanism 3 in the illustrated embodiment has a processing-feed means 37 for moving the first sliding block 32 along the pair of guide rails 31 and 31 in the processing-feed direction (X direction) indicated by the arrow X. The processing-feed means 37 comprises a male screw rod 371 arranged between the above pair of guide rails 31 and 31 parallel to each other and a drive source such as a pulse motor 372 for rotary-driving the male screw rod 371. The male screw rod 371 is, at its one end, rotatably supported to a bearing block 373 fixed on the above stationary base 2 and is, at the other end, transmission-coupled to the output shaft of the above pulse motor 372. The male screw rod 371 is screwed into a threaded through-hole formed in a female screw block (not shown) projecting from the undersurface of the center portion of the first sliding block 32. Therefore, by driving the male screw rod 371 in a normal direction or adverse direction with the pulse motor 372, the first sliding block 32 is moved along the guide rails 31 and 31 in the processing-feed direction (X direction) indicated by the arrow X.

The laser beam processing machine in the illustrated embodiment has a processing-feed amount detection means 374 for detecting the processing-feed amount of the above chuck table 36. The processing-feed amount detection means 374 is composed of a linear scale 374a arranged along the guide rail 31 and a read head 374b which is mounted on the first sliding block 32 and moves along the linear scale 374a together with the first sliding block 32. The read head 374b of this processing-feed amount detection means 374 supplies one pulse signal for every 1 μm to a control means which will be described later in the illustrated embodiment. The control means counts the input pulse signals to detect the processing-feed amount of the chuck table 36. When the pulse motor 372 is used as a drive source for the above processing-feed means 37, the processing-feed amount of the chuck table 36 can be detected by counting the drive pulses of the control means (described later) for outputting a drive signal to the pulse motor 372. Further, when a servo motor is used as a drive source for the above processing-feed means 37, pulse signals outputted from a rotary encoder for detecting the revolution of the servo motor are supplied into the control means (described later) and the control means counts the input pulse signals, thereby making it possible to detect the processing-feed amount of the chuck table 36.

The above second sliding block 33 has, on its undersurface, a pair of to-be-guided grooves 331 and 331 to be fitted to the pair of guide rails 322 and 322 provided on the top surface of the above first sliding block 32 and can move in the indexing-feed direction (Y direction) indicated by the arrow Y when the to-be-guided grooves 331 and 331 are fitted to the pair of guide rails 322 and 322, respectively. The chuck table mechanism 3 in the illustrated embodiment has a first indexing-feed means 38 for moving the second sliding block 33 along the pair of guide rails 322 and 322 provided on the first sliding block 32 in the indexing-feed direction (Y direction) indicated by the arrow Y. The first indexing-feed means 38 comprises a male screw rod 381 which is arranged between the above pair of guide rails 322 and 322 parallel to each other and a drive source such as a pulse motor 382 for rotary-driving the male screw rod 381. The male screw rod 381 is, at its one end, rotatably supported to a bearing block 383 fixed on the top surface of the above first sliding block 32 and is, at the other end, transmission-coupled to the output shaft of the above pulse motor 382. The male screw rod 381 is screwed into a threaded through-hole formed in a female screw block (not shown) projecting from the undersurface of the center portion of the second sliding block 33. Therefore, by driving the male screw rod 381 in a normal direction or adverse direction with the pulse motor 382, the second sliding block 33 is moved along the guide rails 322 and 322 in the indexing-feed direction (Y direction) indicated by the arrow Y.

The laser beam processing machine in the illustrated embodiment comprises an indexing-feed amount detection means 384 for detecting the indexing-feed amount of the above second sliding block 33. This indexing-feed amount detection means 384 comprises a linear scale 384a which is arranged along the guide rail 322 and a read head 384b which is mounted on the second sliding block 33 and moves along the linear scale 384a together with the second sliding block 33. The read head 384b of the indexing-feed amount detection means 384 supplies one pulse signal for every 1 μm to the control means in the illustrated embodiment. The control means counts the input pulse signals to detect the indexing-feed amount of the chuck table 36. When the pulse motor 382 is used as a drive source for the above first indexing-feed means 38, the indexing-feed amount of the chuck table 36 can be detected by counting the drive pulses of the control means for outputting a drive signal to the pulse motor 382. Further, when a servo motor is used as a drive source for the above first indexing-feed means 38, pulse signals outputted from a rotary encoder for detecting the revolution of the servo motor are supplied into the control means (described later) and the control means counts the input pulse signals, thereby making it possible to detect the indexing-feed amount of the chuck table 36.

The above laser beam application unit support mechanism 4 comprises a pair of guide rails 41 and 41 mounted on the stationary base 2 and arranged parallel to each other in the indexing-feed direction (Y direction) indicated by the arrow Y and a movable support base 42 mounted on the guide rails 41 and 41 in such a manner that it can move in the direction indicated by the arrow Y. This movable support base 42 consists of a movable support portion 421 movably mounted on the guide rails 41 and 41 and a mounting portion 422 mounted on the movable support portion 421. The mounting portion 422 is provided with a pair of guide rails 423 and 423 extending parallel to each other in the direction (Z direction) indicated by the arrow Z on one of its flanks. The laser beam application unit support mechanism 4 in the illustrated embodiment has a second indexing-feed means 43 for moving the movable support base 42 along the pair of guide rails 41 and 41 in the indexing-feed direction (Y direction) indicated by the arrow Y. This second indexing-feed means 43 comprises a male screw rod 431 which is arranged between the above pair of guide rails 41 and 41 parallel to each other and a drive source such as a pulse motor 432 for rotary-driving the male screw rod 431. The male screw rod 431 is, at its one end, rotatably supported to a bearing block (not shown) fixed on the above stationary base 2 and is, at the other end, transmission-coupled to the output shaft of the above pulse motor 432. The male screw rod 431 is screwed into a threaded through-hole formed in a female screw block (not shown) projecting from the undersurface of the center portion of the movable support portion 421 constituting the movable support base 42. Therefore, by driving the male screw rod 431 in a normal direction or adverse direction with the pulse motor 432, the movable support base 42 is moved along the guide rails 41 and 41 in the indexing-feed direction (Y direction) indicated by the arrow Y.

The laser beam application unit 5 in the illustrated embodiment comprises a unit holder 51 and a laser beam application means 52 secured to the unit holder 51. The unit holder 51 has a pair of to-be-guided grooves 511 and 511 to be slidably fitted to the pair of guide rails 423 and 423 provided on the above mounting portion 422 and is supported in such a manner that it can move in the direction (Z direction) indicated by the arrow Z by fitting the to-be-guided grooves 511 and 511 to the above guide rails 423 and 423, respectively.

The laser beam application unit 5 in the illustrated embodiment has a moving means 53 for moving the unit holder 51 along the pair of guide rails 423 and 423 in the direction (Z direction) indicated by the arrow Z. The moving means 53 comprises a male screw rod (not shown) arranged between the pair of guide rails 423 and 423 and a drive source such as a pulse motor 532 for rotary-driving the male screw rod. By driving the male screw rod (not shown) in a normal direction or adverse direction with the pulse motor 532, the unit holder 51 and the laser beam application means 52 are moved along the guide rails 423 and 423 in the direction (Z direction) indicated by the arrow Z. In the illustrated embodiment, the laser beam application means 52 is moved up by driving the pulse motor 532 in the normal direction and moved down by driving the pulse motor 532 in the adverse direction.

Figure 2:
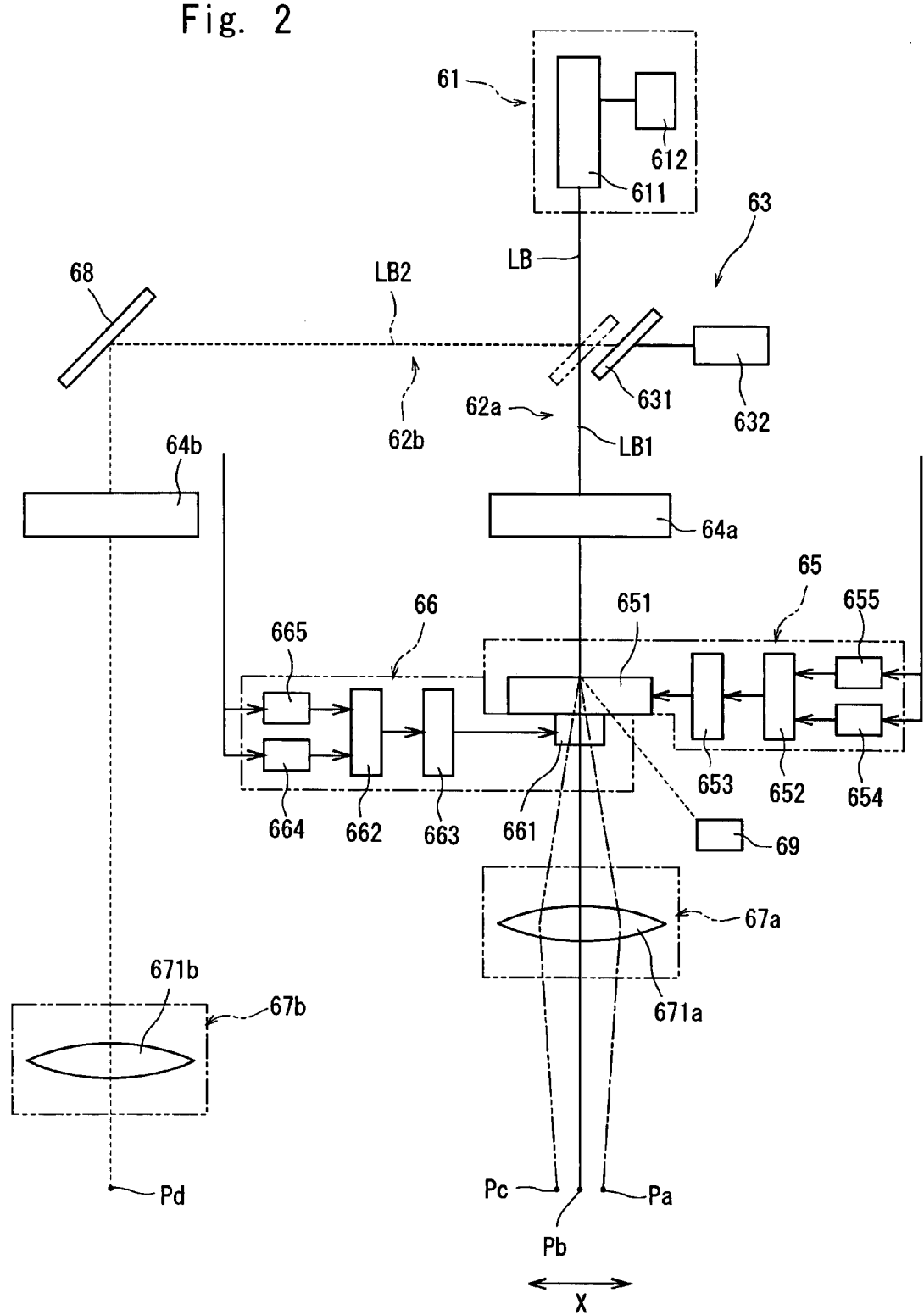
FIG. 2 is a constituent block diagram of a laser beam application means provided in the laser beam processing machine shown in FIG. 1.

The illustrated laser beam application means 52 comprises a casing 521 extending substantially horizontally. In the casing 521, there are installed a shared pulse laser beam oscillation means 61 for oscillating a pulse laser beam and a route switching means 63, as shown in FIG. 2. A pulse laser beam LB oscillated from this pulse laser beam oscillation means 61 is selectively switched between a first route 62a and a second route 62b by the route switching means 63. A first pulse laser beam LB1 switched to the first route 62a by the route switching means 63 is converged by the first condenser lens 671a of a first condenser 67a through a first output adjustment means 64a, a first acousto-optic deflection means 65 and a second acousto-optic deflection means 66. Therefore, the shared pulse laser beam oscillation means 61, the route switching means 63, the first output adjustment means 64a, the first acousto-optic deflection means 65, the second acousto-optic deflection means 66 and the first condenser 67a function as a first pulse laser beam application means. Meanwhile, a second pulse laser beam LB2 switched to the second route 62b by the route switching means 63 is converged by the second condenser lens 671b of a second condenser 67b through a direction changing mirror 68 and a second output adjustment means 64b. Therefore, the shared pulse laser beam oscillation means 61, the route switching means 63, the direction changing mirror 68, the second output adjustment means 64b and the second condenser 67b function as a second pulse laser beam application means.

The above pulse laser beam oscillation means 61 is constituted by a pulse laser beam oscillator 611 and a repetition frequency setting means 612 attached to the pulse laser beam oscillator 611. The pulse laser beam oscillator 611 is composed of a YVO4 laser or YAG laser oscillator in the illustrated embodiment and oscillates a pulse laser beam LB having a repetition frequency set by the repetition frequency setting means 612. The above route switching means 63 comprises a direction changing mirror 631 and an actuator 632 for selectively moving the direction changing mirror 631 to a first position retreated from the route of the pulse laser beam LB oscillated from the pulse laser beam oscillation means 61 as shown by the solid line in FIG. 2 and a second position located in the route of the pulse laser beam LB oscillated from the pulse laser beam oscillation means 61 as shown by the long dashed double-short dashed line in FIG. 2. The above first output adjustment means 64a and the second output adjustment means 64b adjust the outputs of the first pulse laser beam LB1 and the second pulse laser beam LB2 to predetermined values, respectively.

The above first acousto-optic deflection means 65 comprises a first acousto-optic device 651 for deflecting the optical axis of the first laser beam LB1 in the processing-feed direction (X direction), a first RF oscillator 652 for generating RF (radio frequency) to be applied to the first acousto-optic device 651, a first RF amplifier 653 for amplifying, the power of RF generated by the first RF oscillator 652 and applying it to the first acousto-optic device 651, a first deflection angle adjustment means 654 for adjusting the frequency of RF generated by the first RF oscillator 652, and a first output adjustment means 655 for adjusting the amplitude of RF generated by the first RF oscillator 652. The above first acousto-optic device 651 can adjust the deflection angle of the optical axis of a laser beam according to the frequency of the applied RF and the output of a laser beam according to the amplitude of the applied RF. The above first deflection angle adjustment means 654 and the above first output adjustment means 655 are controlled by the control means described later.

The above second acousto-optic deflection means 66 comprises a second acousto-optic device 661 for deflecting the optical axis of the above first laser beam LB1 in the indexing-feed direction (Y direction: perpendicular to the sheet in FIG. 2) perpendicular to the processing-feed direction (X direction), a second RF oscillator 662 for generating RF to be applied to the second acousto-optic device 661, a second RF amplifier 663 for amplifying the power of RF generated by the second RF oscillator 662 and applying it to the second acousto-optic device 661, a second deflection angle adjustment means 664 for adjusting the frequency of RF generated by the second RF oscillator 662, and a second output adjustment means 665 for adjusting the amplitude of RF generated by the second RF oscillator 662. The above second acousto-optic device 661 can adjust the deflection angle of the optical axis of a laser beam according to the frequency of the applied RF and the output of a laser beam according to the amplitude of the applied RF. The above second deflection angle adjustment means 664 and the above second output adjustment means 665 are controlled by the control means described later.

The laser beam application means 52 in the illustrated embodiment comprises a laser beam absorbing means 69 for absorbing a laser beam deflected by the first acousto-optic device 651 as shown by the broken line in FIG. 2 when RF having a predetermined frequency is applied to the above first acousto-optic device 651.

The above first acousto-optic deflection means 65 and the above second acousto-optic deflection means 66 are constituted as described above, and their functions will be described hereinbelow.

When a voltage of, for example, 0 V is applied to the first deflection angle adjustment means 654 of the first acousto-optic deflection means 65 to apply RF having a frequency corresponding to 0 V to the first acousto-optic device 651, the first pulse laser beam LB1 is guided to the laser beam absorbing means 69 as shown by the broken line in FIG. 2. When a voltage of, for example, 5 V is applied to the first deflection angle adjustment means 654 of the first acousto-optic deflection means 65 to apply RF having a frequency corresponding to 5 V to the first acousto-optic device 651, the optical axis of the first pulse laser beam LB1 is deflected and focused at a focal point Pa as shown by the dashed-dotted line in FIG. 2. When a voltage of, for example, 10 V is applied to the first deflection angle adjustment means 654 to apply RF having a frequency corresponding to 10 V to the first acousto-optic device 651, the optical axis of the first pulse laser beam LB1 is deflected and focused at a focal point Pb which shifts from the above focal point Pa a predetermined distance in the left direction of the processing-feed direction (X direction) as shown by the solid line in FIG. 2. When a voltage of, for example, 15V is applied to the first deflection angle adjustment means 654 to apply RF having a frequency corresponding to 15 V to the first acousto-optic device 651, the optical axis of the first pulse laser beam LB1 is deflected and focused at a focal point Pc which shifts from the above focal point Pb a predetermined distance in the left direction of the processing-feed direction (X direction) as shown by the long dashed double-dotted dashed line in FIG. 2. Thus, the laser beam whose optical axis is deflected by the first acousto-optic device 651 is deflected in the processing-feed direction (X direction) in accordance with a voltage applied to the first deflection angle adjustment means 654. Since the first condenser lens 671a of the first condenser 67a for converging the first pulse laser beam LB1 has an NA value of 0.01 and a relatively long focal distance f1 of 200 mm in the illustrated embodiment, it is possible to secure a predetermined amount of displacement between the above focal point Pa and the above focal point Pc.

The second acousto-optic deflection means 66 can also deflect the optical axis of the first pulse laser beam LB1 in the indexing-feed direction (Y direction: perpendicular to the sheet in FIG. 2) perpendicular to the processing-feed direction (X direction) by adjusting a voltage applied to the second deflection angle adjustment means 664 and the frequency of RF applied to the second acousto-optic device 661, like the above first acousto-optic deflection means 65.

Figure 3:
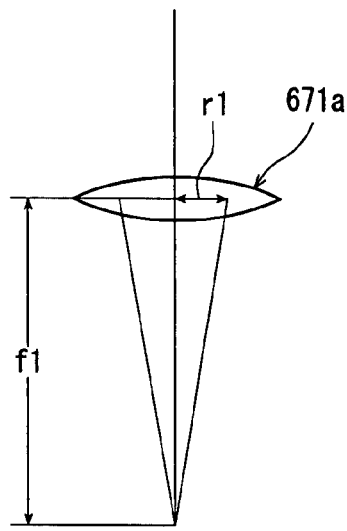
FIG. 3 is a diagram for explaining the NA value of a first condenser lens provided in a first condenser constituting the laser beam application means shown in FIG. 2.
Figure 4:
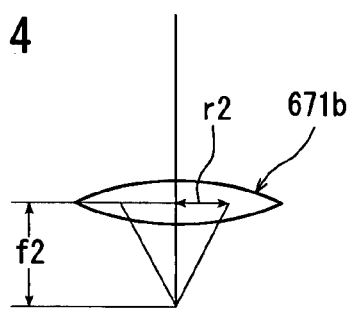
FIG. 4 is a diagram for explaining the NA value of a second condenser lens provided in a second condenser constituting the laser beam application means shown in FIG. 2.

The first condenser lens 671a of the first condenser 67a and the second condenser lens 671b of the second condenser 67b will be described with reference to FIGS. 3 and 4.

The NA value of the first condenser lens 671a is set smaller than the NA value of the second condenser lens 671b. The NA value of the first condenser lens 671a in the illustrated embodiment is set to 0.01 and the NA value of the second condenser lens 671b is set to 0.04. For instance, as shown in FIG. 3, the radius r1 of the area (effective area) for forming the focal point, called "pupil", of the first condenser lens 671a is set to 2 mm, the focal distance f1 is set to 200 mm, and the NA value (NA≈r1/f1) becomes 0.01. Meanwhile, as shown in FIG. 4, the radius r2 of the area (effective area) for forming the focal point, called "pupil", of the second condenser lens 671b is set to 2 mm, the focal distance f2 is set to 50 mm, and the NA value (NA≈r2/f2) becomes 0.04. It is desired that the NA value of the first condenser lens 671a should be set to 0.01 or less and the NA value of the second condenser lens 671b should be set to 0.02 or more. The first condenser 67a comprising the first condenser lens 671a and the second condenser 67b comprising the second condenser lens 671b are mounted on the end of the casing 521, as shown in FIG. 1.

Returning to FIG. 1, an image pick-up means 7 for detecting the area to be processed by the laser beam application means 52 is installed at the end portion of the casing 521 constituting the above laser beam application means 52. This image pick-up means 7 is constituted by an infrared illuminating means for applying infrared radiation to the workpiece, an optical system for capturing infrared radiation applied by the infrared illuminating means and an image pick-up device (infrared CCD) for outputting an electric signal corresponding to infrared radiation captured by the optical system, in addition to an ordinary image pick-up device (CCD) for picking up an image with visible radiation. An image signal obtained is supplied to the control means described later.

The laser beam processing machine in the illustrated embodiment comprises the control means 10. The control means 10 is composed of a computer which comprises a central processing unit (CPU) 101 for carrying out arithmetic processing based on a control program, a read-only memory (ROM) 102 for storing the control program, etc., a read/write random access memory (RAM) 103 for storing the results of operations, a counter 104, an input interface 105 and an output interface 106. Detection signals from the above processing-feed amount detection means 374, the indexing-feed amount detection means 384 and the image pick-up means 7 are supplied to the input interface 105 of the control means 10. And, from the output interface 106 of the control means 10, control signals are supplied to the above pulse motor 372, the pulse motor 382, the pulse motor 432, the pulse motor 532, the pulse laser beam oscillation means 61 of the laser beam application means 52, the first deflection angle adjustment means 654 and the first output adjustment means 655 of the first acousto-optic deflection means 65, and the second deflection angle adjustment means 664 and the second output adjustment means 665 of the second acousto-optic deflection means 66. The above random access memory (RAM) 103 has a first storage area 103a for storing data on the design values of the workpiece which will be described later, and other storage areas.

The laser beam processing machine in the illustrated embodiment is constituted as described above, and its function will be described hereinbelow.

Figure 5:
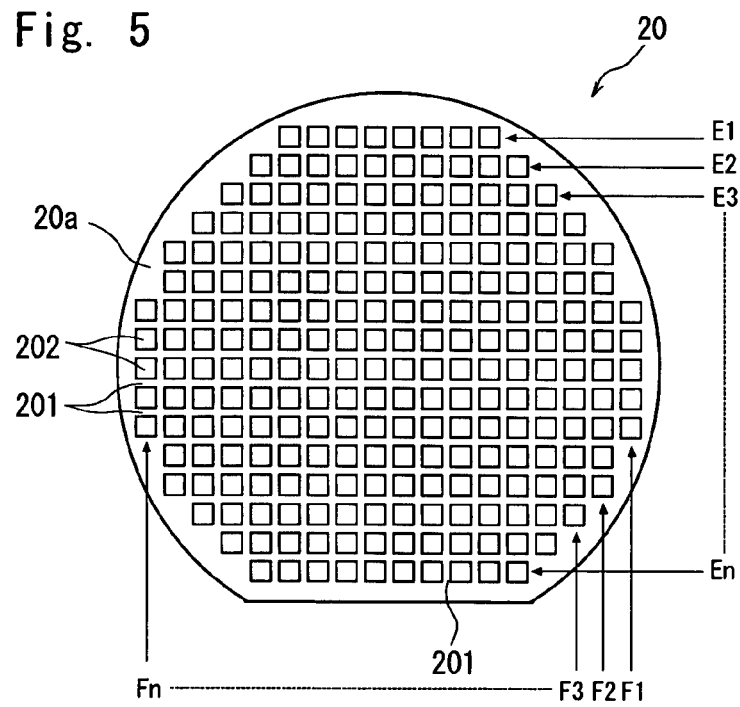
FIG. 5 is a plan view of a semiconductor wafer as a workpiece.
Figure 6:
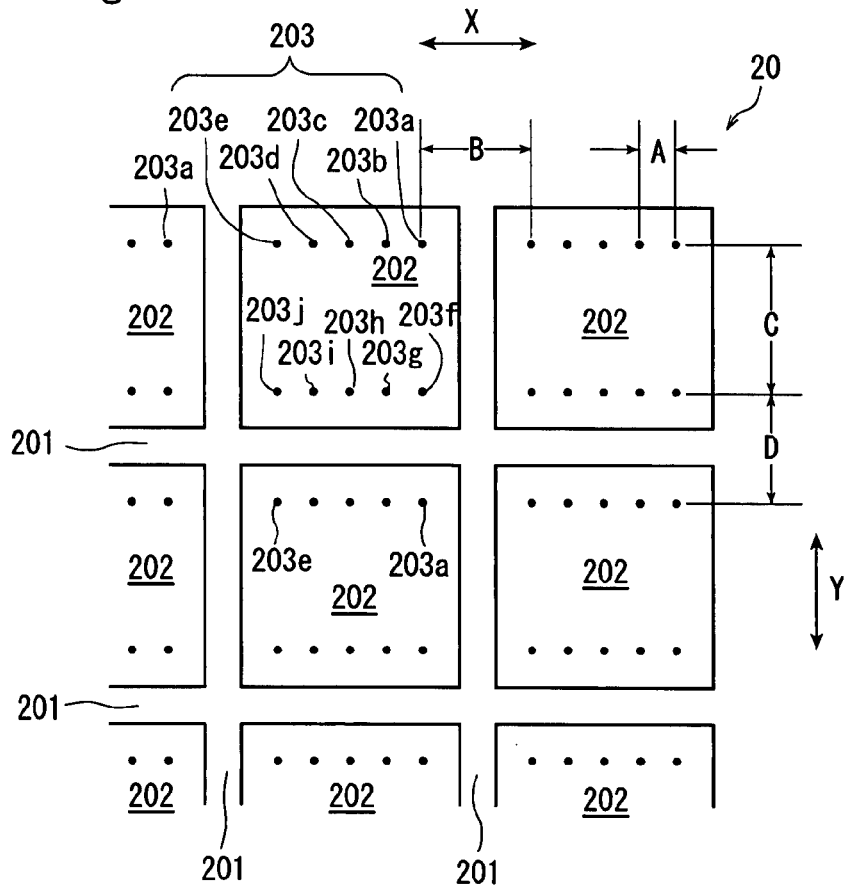
FIG. 6 is a partially enlarged plan view of the semiconductor wafer shown in FIG. 5.

FIG. 5 is a plan view of a semiconductor wafer 20 as the workpiece to be processed by a laser beam. The semiconductor wafer 20 shown in FIG. 5 is a silicon wafer, a plurality of areas are sectioned by a plurality of dividing lines 201 formed in a lattice pattern on the front surface 20a, and a device 202 such as IC, LSI or the like is formed in each of the sectioned areas. The devices 202 are all the same in constitution. A plurality of bonding pads 203 (203a to 203j) are formed on the surface of each device 202 as shown in FIG. 6. In the illustrated embodiment, bonding pads 203a and 203f, bonding pads 203b and 203g, bonding pads 203c and 203h, bonding pads 203d and 203i, and bonding pads 203e and 203j are at the same positions in the X direction. Via holes reaching the plurality of bonding pads 203 (203a to 203j) are respectively formed from the rear surface 20b in portions corresponding to the plurality of bonding pads 203. The intervals A between adjacent bonding pads 203 (203a to 203j) in the X direction (horizontal direction in FIG. 6) and the intervals B between adjacent electrodes in the X direction (horizontal direction in FIG. 6) with the dividing line 201 interposed therebetween, namely, between the bonding pads 203e and 203a out of the bonding pads 203 formed on each device 202 are the same in the illustrated embodiment. Further, the intervals C between adjacent bonding pads 203 (203a to 203j) in the Y direction (vertical direction in FIG. 6) and the intervals D between adjacent bonding pads in the Y direction (vertical direction in FIG. 6) with the dividing line 201 interposed therebetween, namely, between the bonding pads 203f and 203a and between the bonding pads 203j and 203e out of the bonding pads 203 formed on each device 202 are the same in the illustrated embodiment. The design value data of the semiconductor wafer 20 constituted as described above, which include the numbers of devices 202 disposed in rows E1 to En and columns F1 to Fn shown in FIG. 5 and the above intervals A, B, C and D, are stored in the first storage area 103a of the above random access memory (RAM) 103.

Laser processing for forming via holes in portions corresponding to the bonding pads 203 (203a to 203j) of each device 202 formed on the above semiconductor wafer 20 by using the above laser beam processing machine will be described hereinunder.

Figure 7:
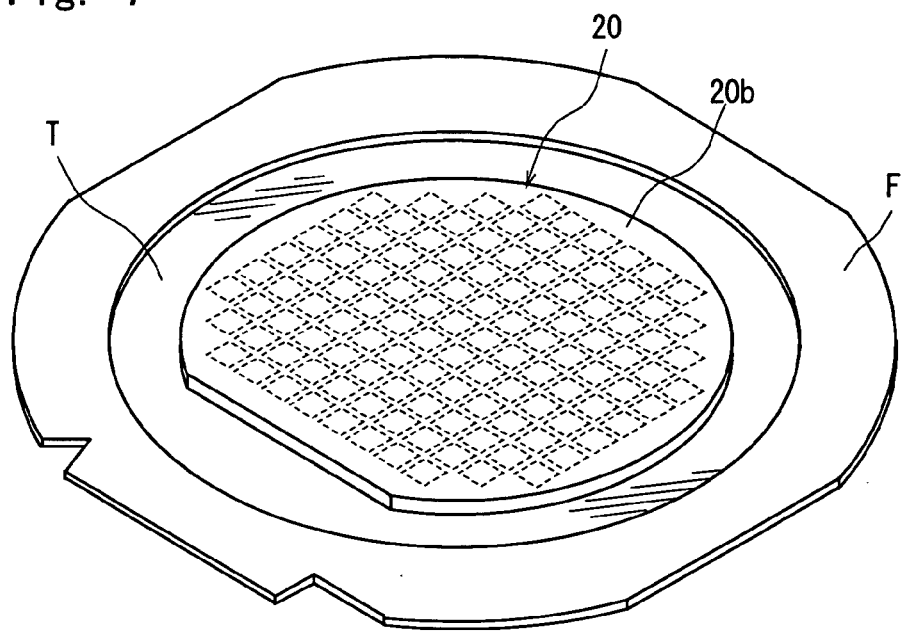
FIG. 7 is a perspective view of the semiconductor wafer shown in FIG. 5 which is put on the front surface of a protective tape mounted on an annular frame.

The front surface 20a of the semiconductor wafer 20 constituted as described above is put on a protective tape T which is formed of a synthetic resin sheet such as a polyolefin sheet or the like and mounted on an annular frame F, as shown in FIG. 7. Therefore, the rear surface 20b of the semiconductor wafer 20 faces up. The protective tape T side of the semiconductor wafer 20 supported to the annular frame F through the protective tape T is placed on the chuck table 36 of the laser beam processing machine shown in FIG. 1. The semiconductor wafer 20 is then suction-held on the chuck table 36 through the protective tape T by activating the suction means that is not shown. The annular frame F is fixed by the clamps 362.

The chuck table 36 suction-holding the semiconductor wafer 20 as described above is brought to a position right below the image pick-up means 7 by the processing-feed means 37. After the chuck table 36 is positioned right below the image pick-up means 7, the semiconductor wafer 20 on the chuck table 36 becomes a state where it has been located at a coordinate position shown in FIG. 8. In this state, alignment work is carried out to check whether the dividing lines 201 formed in a lattice pattern on the semiconductor wafer 20 held on the chuck table 36 are parallel to the X direction and the Y direction or not. That is, an image of the semiconductor wafer 20 held on the chuck table 36 is picked up by the image pick-up means 7 to carry out image processing such as pattern matching, etc. for the alignment work. Although the front surface 20a having the dividing lines 201 of the semiconductor wafer 20 faces down at this point, as the image pick-up means 7 has an image pick-up means constituted by the infrared illuminating means, an optical system for capturing infrared radiation and an image pick-up device (infrared CCD) for outputting an electric signal corresponding to the infrared radiation as described above, an image of the dividing lines 201 can be picked up through the rear surface 20b of the semiconductor wafer 20.

Thereafter, the chuck table 36 is moved to bring a device 202 at the most far left end in FIG. 8 in the top row E1 out of the devices 202 formed on the semiconductor wafer 20 to a position right below the image pick-up means 7. Further, the upper left bonding pad 203a in FIG. 8 out of the bonding pads 203 (203a to 203j) formed on the device 202 is brought to a position right below the image pick-up mean's 7. After the image pick-up means 7 detects the bonding pad 203a in this state, its coordinate value (a1) is supplied to the control means 10 as a first processing-feed start position coordinate value. The control means 10 stores the coordinate value (a1) in the random access memory (RAM) 103 as a first processing-feed start position coordinate value (processing-feed start position detecting step). Since there are predetermined spaces between the image pick-up means 7 and the first condenser 67a and between the image pick-up means 7 and the second condenser 67b of the laser beam application means 52 in the X direction, values obtained by adding the interval between the above image pick-up means 7 and the first condenser 67a and the interval between the image pick-up means 7 and the second condenser 67b are stored as X coordinate values.

Figure 8:
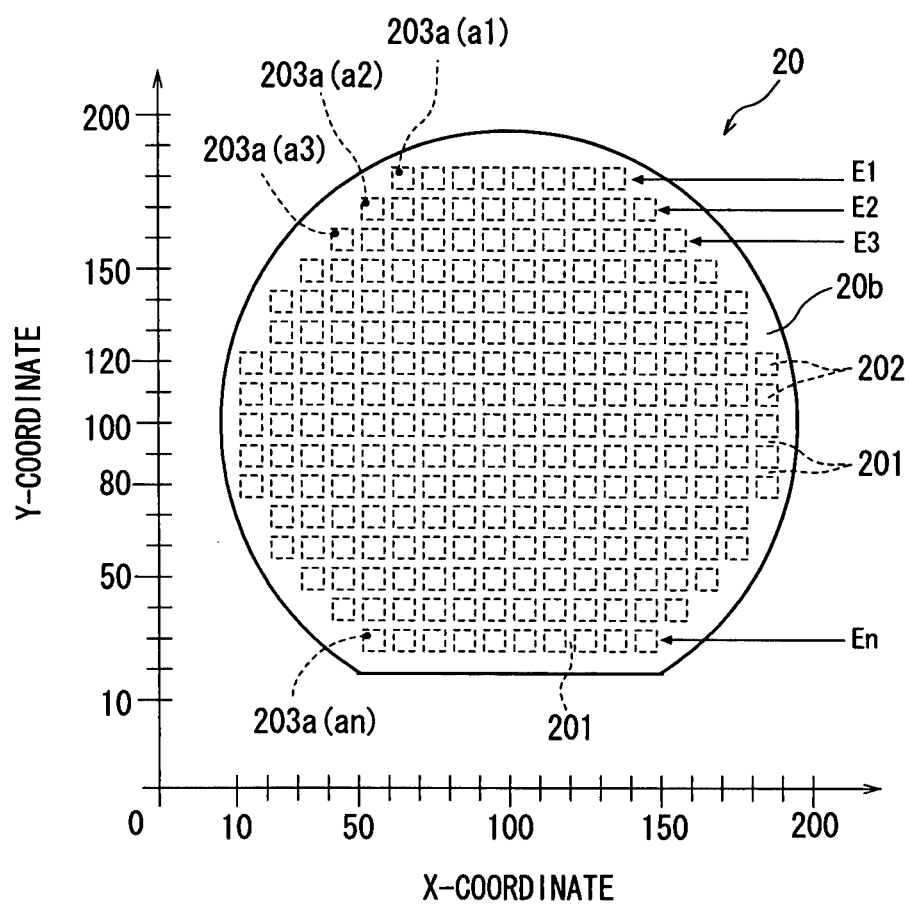
FIG. 8 is an explanatory diagram showing the relationship between the semiconductor wafer shown in FIG. 5 and coordinates when it is held at a predetermined position of the chuck table of the laser beam processing machine shown in FIG. 1.

After the first processing-feed start position coordinate value (a1) of the device 202 in the top row E1 in FIG. 8 is detected as described above, the chuck table 36 is moved (indexing-fed) a distance corresponding to the interval between the dividing lines 201 in the Y direction and at the same time, moved in the X direction to bring a device 202 at the most left end in the second row E2 from the top in FIG. 8 to a position right below the image pick-up means 7. Further, the upper left bonding pad 203a in FIG. 8 out of the bonding pads 203 (203a to 203j) formed on the device 202 is brought to a position right below the image pick-up means 7. After the image pick-up means 7 detects the bonding pad 203a in this state, its coordinate value (a2) is supplied to the control means 10 as a second processing-feed start position coordinate value. The control means 10 stores the coordinate value (a2) in the random access memory (RAM) 103 as a second processing-feed start position coordinate value. Since there are predetermined spaces between the image pick-up means 7 and the first condenser 67a and between the image pick-up means 7 and the second condenser 67b of the laser beam application means 52 in the X direction as described above, values obtained by adding the interval between the image pick-up means 7 and the first condenser 67a and the interval between the image pick-up means 7 and the second condenser 67b are stored as X coordinate values. Subsequently, the control means 10 repeats the above indexing-feed and processing-feed start position detecting steps up to the bottom row En in FIG. 8 to detect the processing-feed start position coordinate values (a3 to an) of the devices 202 formed in all the rows and store them in the random access memory (RAM) 103.

Figure 9:
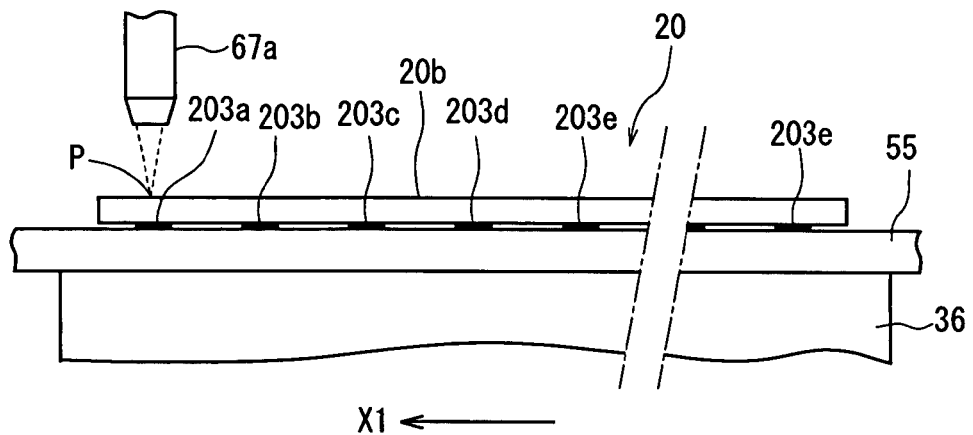
FIGS. 9(a), 9(b) and 9(c) are explanatory diagrams showing a first laser processing step which is carried out by using the laser beam processing machine shown in FIG. 1.
Figure 9:
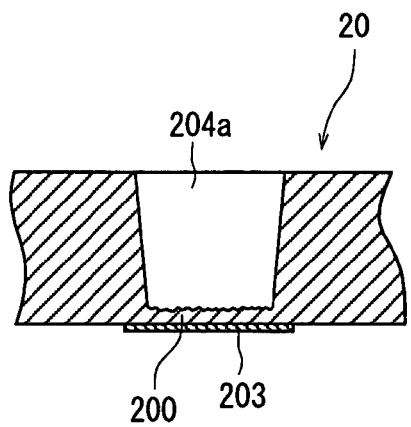
Figure 9:
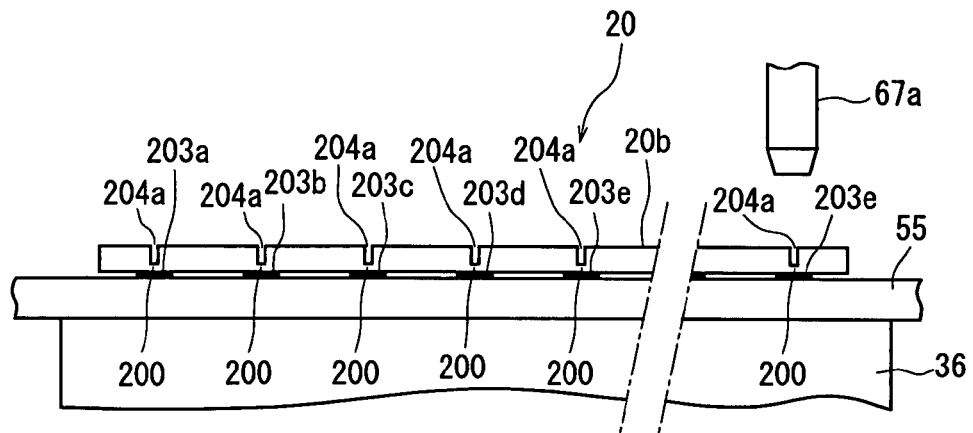

Next comes a first laser processing step for forming an incomplete via hole not reaching a bonding pad by applying the above first pulse laser beam LB1 in portions corresponding to the bonding pads 203 (203a to 203j) formed on each device 202 of the semiconductor wafer 20 while the chuck table 36 holding the semiconductor wafer 20 is moved in the processing-feed direction. In the first laser processing step, the processing-feed means 37 is first activated to move the chuck table 36 so as to bring the point of the first processing-feed start position coordinate value (a1) stored in the above random access memory (RAM) 103 to a position right below the first condenser 67a of the laser beam application means 52. FIG. 9(a) shows a state where the point of the first processing-feed start position coordinate value (a1) is positioned right below the first condenser 67a. In this connection, the control means 10 activates the route switching means 63 of the laser beam application means 52 to move so as to locate the direction changing mirror 68 at a position shown by the solid line in FIG. 2. Therefore, the pulse laser beam LB oscillated from the pulse laser beam oscillation means 61 is switched to the first route 62a. The control means 10 controls the above processing-feed means-37 to move the chuck table 36 in a direction indicated by an arrow X1 in FIG. 9(a) at a predetermined moving rate, from the state shown in FIG. 9(a) and at the same time, activates the laser beam application means 52 to apply a predetermined number of pulses of the first pulse laser beam LB1 switched to the first route 62a, from the first condenser 67a. The focal point P of the laser beam applied from the first condenser 67a is set to a position near the front surface 20a of the semiconductor wafer 20. At this point, the control means 10 outputs a control signal to the first deflection angle adjustment means 654 and the first output adjustment means 655 of the first acousto-optic deflection means 65 based on a detection signal from the read head 374b of the processing-feed amount detection means 374 while the predetermined number of pulses of the first pulse laser beam LB1 are applied. That is, the control means 10 outputs a control signal for giving a voltage ranging from 5 to 15 V to the first deflection angle adjustment means 654. Since a pulse laser beam is not deflected in the Y direction in the first laser processing step in the illustrated embodiment, the control means 10 outputs a control signal for applying a voltage of 10 V to the second deflection angle adjustment means 664 of the second acousto-optic deflection means 66.

Meanwhile, the first RF oscillator 652 outputs RF based on control signals from the first deflection angle adjustment means 654 and the first output adjustment means 655. The power of RF output from the first RF oscillator 652 is amplified by the first RF amplifier 653 and applied to the first acousto-optic device 651. The second RF oscillator 662 also outputs RF based on control signals from the second deflection angle adjustment means 664 and the second output adjustment means 665. The power of RF output from the second RF oscillator 662 is amplified by the second RF amplifier 663 and applied to the second acousto-optic device 661. As a result, the first acousto-optic device 651 and the second acousto-optic device 661 deflect the optical axis of the first pulse laser beam LB1 in a range from the position shown by the dashed-dotted line to the position shown by the long dashed double-short dashed line in FIG. 2.

The processing conditions in the above first laser processing step are set as follows, for example.

Light source: LD excited Q switch Nd: YVO4
Wavelength: 355 nm
Repetition frequency: 10 kHz
Energy density per pulse: 40 J/cm$^2$
Focal spot diameter: 80 μm
Processing-feed rate: 100 mm/sec When the first laser processing step is carried out under the above processing conditions, a laser-processed hole having a depth of about 5 μm per pulse of the pulse laser beam can be formed in the silicon wafer. Therefore, by applying 18 pulses of the pulse laser beam to a silicon wafer having a thickness of 100 μm, a laser-processed hole having a depth of about 90 μm can be formed. Consequently, by applying 18 pulses of the pulse laser beam to the point of the first processing-feed start position coordinate value (a1) of the semiconductor wafer 20 held on the chuck table 36 which is moving at a processing-feed rate of 100 mm/sec under the above processing conditions, an incomplete via hole 204a, leaving a remaining portion 200 having a thickness of about 10 μm from the bonding pad 203 behind as shown in FIG. 9(b), can be formed. The energy density per pulse of the pulse laser beam is suitably 20 to 60 J/cm². Further, the focal spot diameter is suitably 0.7 D to 0.9 D when the diameter of a via hole to be formed is represented by D.

Figure 10:
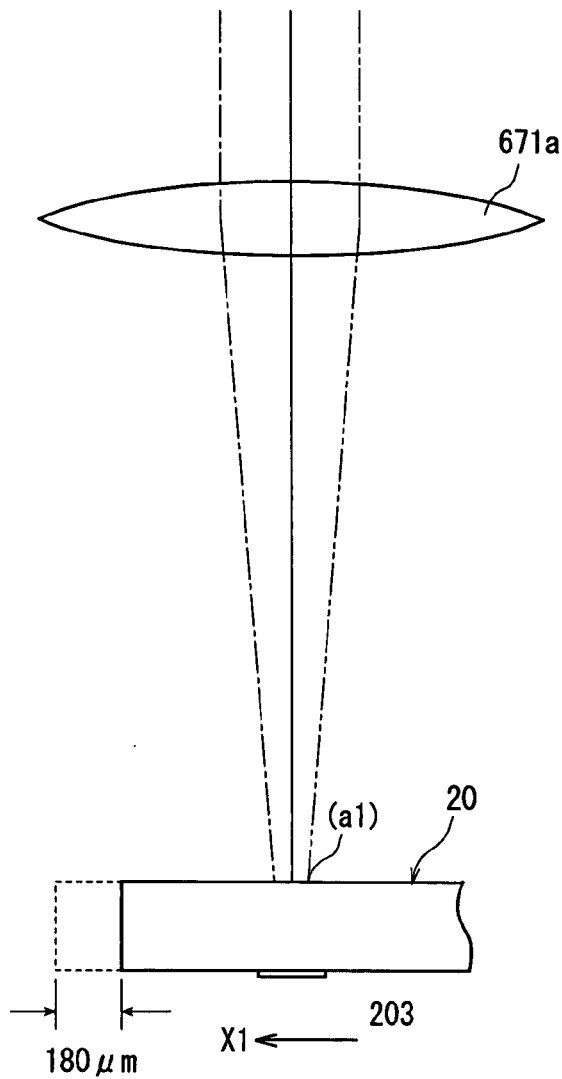
FIGS. 10(a) and 10(b) are explanatory diagrams in an enlarged manner showing details of the first laser processing step shown in FIGS. 9(a) to 9(c)
Figure 10:
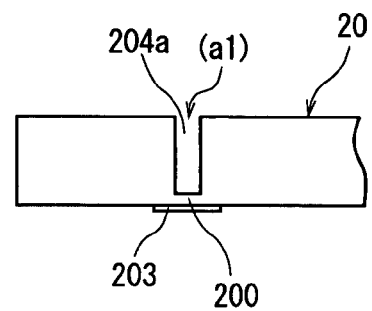

The method of applying 18 pulses of the pulse laser beam to the point of the first processing-feed start position coordinate value (a1) of the semiconductor wafer 20 while the semiconductor wafer 20 is moving at a processing-feed rate of 100 mm/sec will be described with reference to FIGS. 10(a) and 10(b).

Since the repetition frequency of the pulse laser beam is 10 kHz under the above processing conditions, 10,000 pulses (10,000/sec) of the pulse laser beam are applied in one second. Therefore, the time for applying 18 pulses of the pulse laser beam is 18/10,000 sec. Meanwhile, the semiconductor wafer 20 which is moving in the direction indicated by the arrow X1 at a processing-feed rate of 100 mm/sec moves 180 μm in 18/10,000 sec. Therefore, the laser beam application means 52 is activated for 18/10,000 sec while the semiconductor wafer 20 moves 180 μm to control the first deflection angle adjustment means 654 and the first output adjustment means 655 of the first acousto-optic deflection means 65 and the second deflection angle adjustment means 664 and the second output adjustment means 665 of the second acousto-optic deflection means 66 so as to ensure that the focal point of the pulse laser beam is positioned at the point of the first processing-feed start position coordinate value (a1) during this. This can be carried out by the control means 10 which controls voltage to be applied to the first deflection angle adjustment means 654 and the first output adjustment means 655 of the first acousto-optic deflection means 65 and the second deflection angle adjustment means 664 and the second output adjustment means 665 of the second acousto-optic deflection means 66 based on a detection signal from the read head 374b of the processing-feed amount detection means 374, thereby controlling the frequency of RF to be applied to the first acousto-optic device 651 of the first acousto-optic deflection means 65 and the second acousto-optic device 661 of the second acousto-optic deflection means 66, as described above. As a result, as 18 pulses of the pulse laser beam can be applied to the point of the first processing-feed start position coordinate value (a1) even when the semiconductor wafer 20 is moving in the feed direction indicated by the arrow X1, the incomplete via hole 204a is formed at the point of the first processing-feed start position coordinate value (a1) of the semiconductor wafer 20, leaving the remaining portion 200 having a thickness of about 10 μm from the bonding pad 203 behind, as shown in FIG. 10(b). After 18 pulses of the pulse laser beam are applied to the point of the first processing-feed start position coordinate value (a1), the control means 10 applies a voltage of 0 V to the first deflection angle adjustment means 654 of the first acousto-optic deflection means 65 and RF having a frequency corresponding to 0 V to the first acousto-optic device 651 so as to guide the first pulse laser beam LB1 to the laser beam absorbing means 69 as shown by the broken line in FIG. 2.

Meanwhile, the control means 10 receives a detection signal from the read head 374b of the processing-feed amount detection means 374, and counts the detection signal by means of the counter 104. And, when the count value of the counter 104 reaches a value equivalent to the interval A in the X direction in FIG. 6 between adjacent bonding pads 203, the control means 10 controls the laser beam application means 52 to carry out the above first laser processing step. Thereafter, the control means 10 further activates the laser beam application means 52 to carry out the above first laser processing step every time the count value of the counter 104 reaches values equivalent to the intervals A and B in the X direction in FIG. 6 between adjacent bonding pads 203. After the above first laser processing step is carried out on the bonding pad 203e at the most far right end in FIG. 9(c) out of the bonding pads 203 formed on the device 202 at the most far right end in the row E1 of the semiconductor wafer 20, as shown in FIG. 9(c), the operation of the above processing-feed means 37 is suspended and the movement of the chuck table 36 is stopped. As a result, in the semiconductor wafer 20, incomplete via holes 204a, leaving remaining portions 200 having a thickness of about 10 μm from the bonding pads 203 (not shown) behind as shown in FIG. 9(b), are formed.

Figure 11:
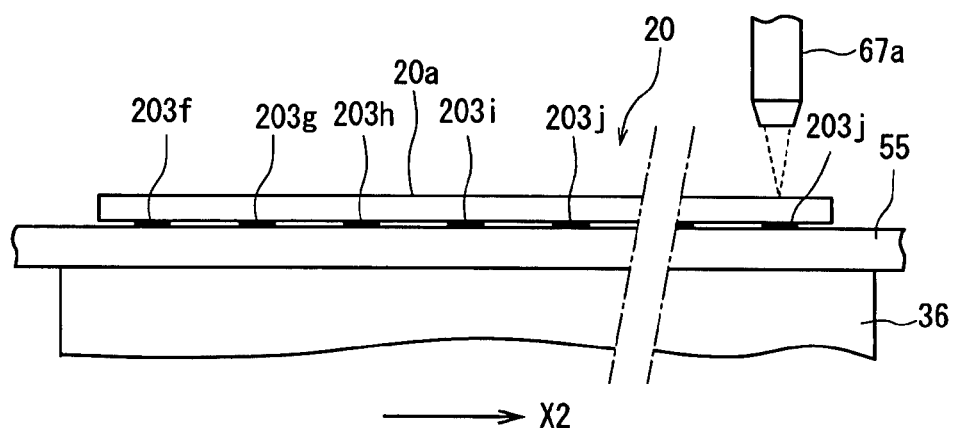
FIGS. 11(a) and 11(b) are explanatory diagrams showing the first laser processing step which is carried out by using the laser beam processing machine shown in FIG. 1.
Figure 11:
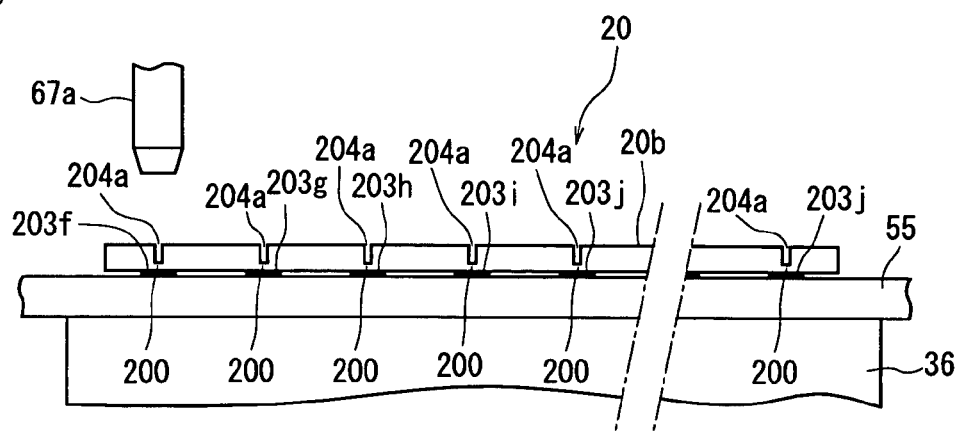

Thereafter, the control means 10 controls the above first indexing-feed means 38 to move the chuck table 36 in the indexing-feed direction perpendicular to the sheet in FIG. 9(c). Meanwhile, the control means 10 receives a detection signal from the read head 384b of the indexing-feed amount detection means 384, and counts the detection signal by means of the counter 104. When the count value of the counter 104 reaches a value equivalent to the interval C in the Y direction in FIG. 6 between adjacent bonding pads 203, the operation of the first indexing-feed means 38 is suspended. As a result, the bonding pad 203j (see FIG. 6) opposed to the above bonding pad 203e formed on the semiconductor wafer 20 held on the chuck table 36 is positioned right below the first condenser 67a. FIG. 11(a) shows this state. The control means 10 controls the above processing-feed means 37 so as to move the chuck table 36 in an indexing-feed direction indicated by an arrow X2 in FIG. 11(a) at a predetermined moving rate in this state shown in FIG. 11(a) and at the same time, activates the laser beam application means 52 to carry out the above first laser processing step. And, the control means 10 counts a detection signal from the read head 374b of the processing-feed amount detection means 374 by means of the counter 104 and, every time the count value reaches values equivalent to the intervals A and B in the X direction in FIG. 6 between adjacent bonding pads 203, the control means 10 activates the laser beam application means 52 to carry out the above first laser processing step. After the above first laser processing step is carried out on the bonding pad 203f formed on the device 202 at the most far left end in the row E1 of the semiconductor wafer 20 as shown in FIG. 11(b), the operation of the above processing-feed means 37 is suspended and the movement of the chuck table 36 is stopped. As a result, in the semiconductor wafer 20, incomplete via holes 204a, leaving remaining portions 200 having a thickness of about 10 μm from the bonding pads 203 in portions corresponding to the bonding pads 203 (not shown) behind, are formed, as shown in FIG. 11(b).

Since the first pulse laser beam LB1 is applied while the chuck table 36 holding the semiconductor wafer 20 is being moved in the processing-feed direction in the first laser processing step as described above, the incomplete via holes 204 can be formed efficiently. In the illustrated embodiment, as the first condenser lens 671a of the first condenser 67a for converging the first pulse laser beam LB1 has an NA value of 0.01 and a relatively long focal distance f1 of 200 mm to secure a predetermined amount of displacement of the focal point of the first pulse laser beam LB1 caused by the deflection of the optical axis as described above, the focal distance becomes long and the focal depth becomes large, thereby increasing the processable length of the laser beam. Because of this, there is a problem in that when processing is made up to a position close to the bonding pad, heat is accumulated and the temperature reaches the melting point of the bonding pad when the bonding pad is reached, whereby the bonding pad is molten. However, as the incomplete via hole 204a, leaving the remaining portion 200 having a thickness of about 10 μm from the bonding pad 203 behind, is formed in the above first laser processing step, the bonding pad 203 is not molten.

After the incomplete via holes 204a, leaving the remaining portions 200 behind in portions corresponding to the bonding pads 203 formed on the devices 202 in the row E1 of the semiconductor wafer 20, are formed as described above, the control means 10 activates the processing-feed means 37 and the first indexing-feed means 38 to bring the point of the second processing-feed start position coordinate value (a2) stored in the above random access memory (RAM) 103 out of the bonding pads 203 formed on the devices 202 in the row E2 of the semiconductor wafer 10 to a position right below the first condenser 67a of the laser beam application means 52. Then, the control means 10 controls the laser beam application means 52, the processing-feed means 37 and the first indexing-feed means 38 to carry out the above first laser processing step on portions corresponding to the bonding pads 203 formed on the devices 202 in the row E2 of the semiconductor wafer 20. Afterward, the above first laser processing step is also carried out on portions corresponding to the bonding pads 203 formed on the devices 202 in the rows E2 to En of the semiconductor wafer 20. As a result, the incomplete via holes 204a, leaving remaining portions 200 having a thickness of about 10 μm from the bonding pads 203 in portions corresponding to all the bonding pads 203 formed on the devices 202 of the semiconductor wafer 20 behind, are formed.

In the above first laser processing step, a pulse laser beam is not applied to the semiconductor wafer 20 in the areas of the intervals A and B in X direction in FIG. 6. In order not to apply the pulse laser beam to the semiconductor wafer 20 as described above, the above control means 10 applies a voltage of 0 V to the first deflection angle adjustment means 654 of the first acousto-optic deflection means 65. As a result, RF having a frequency corresponding to 0 V is applied to the first acousto-optic device 651 and the first pulse laser beam LB1 is guided to the laser beam absorbing means 69, as shown by the broken line in FIG. 2, whereby the pulse laser beam is not applied to the semiconductor wafer 20.

After the first laser processing step for forming the incomplete via holes 204, leaving the remaining portions 20 having a thickness of about 10 μm behind, in the portions corresponding to all the bonding pads 203 formed on the devices 202 of the semiconductor wafer 20, as described above, next comes a second laser processing step for forming via holes reaching the bonding pads 203 by applying a predetermined number of pulses of the laser beam to the remaining portions 200.

Figure 12:
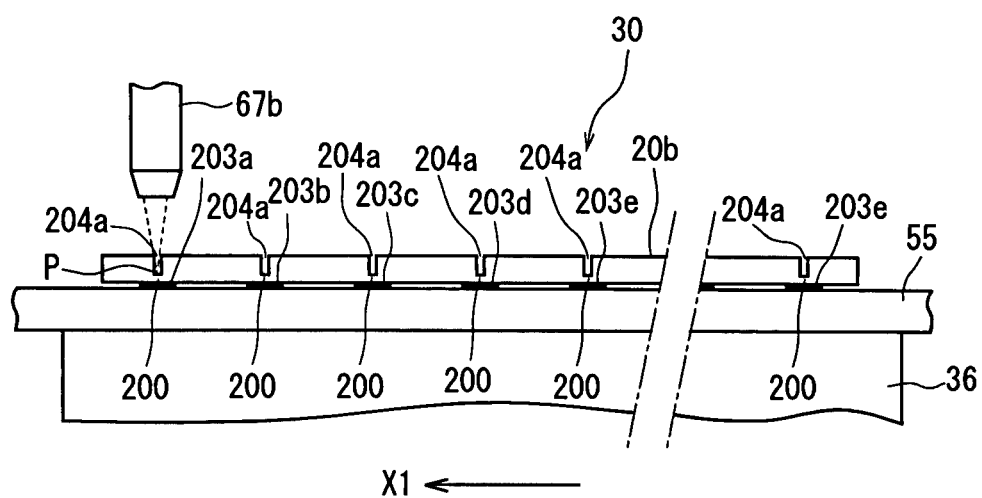
FIGS. 12(a) and 12(b) are explanatory diagrams showing a second laser processing step which is carried out by using the laser beam processing machine shown in FIG. 1.
Figure 12:
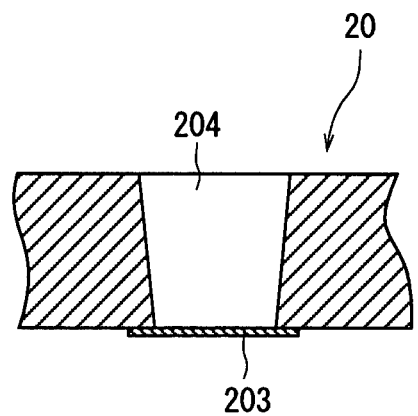

In the second laser processing step, the processing-feed means 37 is first activated to move the chuck table 36 to bring the point of the first processing-feed start position coordinate value (a1) stored in the above random access memory (RAM) 103 to a position right below the second condenser 67b of the laser beam application means 52. FIG. 12(a) shows a state where the point of the first processing-feed start position coordinate value (a1) is positioned right below the second condenser 67b. The control means 10 activates the route switching means 63 of the laser beam application means 52 to locate the direction changing mirror 631 to the position shown by the long dashed double-short dashed line in FIG. 2. Therefore, the pulse laser beam LB oscillated from the pulse laser beam oscillation means 61 is switched to the second route 62b. In the state shown in FIG. 12(a), the control means 10 activates the laser beam application means 52 to apply a predetermined number of pulses of the second pulse laser beam LB2 switched to the second route 62b, from the second condenser 67b. The focal point P of the laser beam irradiated from the second condenser 67b is set to a position near the top surface of the remaining portion 200 of the incomplete via hole 204a formed in the semiconductor wafer 20.

Since the second laser processing step is carried out after the movement of the chuck table 36 is stopped in the illustrated embodiment, processing conditions other than the processing-feed rate may be the same as the processing conditions of the first laser processing step. Since a laser-processed hole having a depth of about 5 μm can be formed in the silicon wafer with one pulse of the pulse laser beam under the processing conditions of the above first laser processing step as described above, two pulses of the pulse laser beam may be applied to process the remaining portion 200 having a thickness of about 10 μm. That is, by applying two pulses of the second pulse laser beam LB2 from the second condenser 67b, a via hole 204 reaching the bonding pad 203 can be formed, as shown in FIG. 12(b). By carrying out this second laser processing step in portions corresponding to all the bonding pads 203 formed on the devices 202 of the semiconductor wafer 20, via holes 204 reaching all the bonding pads 203 are formed in the semiconductor wafer 20.

Since in the illustrated embodiment, the second condenser lens 671b of the second condenser 67b for converging the second pulse laser beam LB2 is set to have an NA value of 0.04 and a short focal distance f1 of 50 mm as described above, the focal distance is short and the focal depth is small, thereby reducing the processable length of the laser beam. Therefore, it is easy to control the processing of the above remaining portions 200 up to the bonding pads 203.

While the invention has been described with reference to the illustrated embodiment, it is to be understood that the invention is not limited thereto and various changes and modifications may be made without departing from the spirit and scope thereof. For example, the laser beam application means comprises a shared pulse laser beam oscillation means in the illustrated embodiment. A first laser beam application means comprising a first pulse laser beam oscillation means for oscillating the first pulse laser beam LB1 and a second laser beam application means comprising a second pulse laser beam oscillation means for oscillating the second pulse laser beam LB2 may be employed.

What is claimed is:

1. A laser beam processing machine comprising a chuck table for holding a workpiece, a laser beam application means for applying a laser beam to the workpiece held on the chuck table, a processing-feed means for moving the chuck table and the laser beam application means relative to each other in a processing-feed direction, and a controller, the laser beam application means comprising:

a shared pulse laser beam oscillation means acting as a first pulse laser beam oscillation means and a second pulse laser beam oscillation means, an acousto-optic deflection means for deflecting the optical axis of a first pulse laser beam oscillated by the first oscillation means in the processing-feed direction, a first condenser lens for converging the first pulse laser beam passing through the acousto-optic deflection mean, a second condenser lens for converging a second pulse laser beam oscillated by the second oscillation means, and a route switching means that selectively switches a pulse laser beam oscillated from the shared pulse laser beam oscillation means between a first optical route including the first oscillation means, the acousto-optic deflection means, and the first condenser lens, and a second optical route including the second oscillation means and the second condenser lens, wherein the acousto-optic deflection means is installed in the first optical route and is not installed in the second optical route, the controller controls the processing machine so that the first pulse laser beam in the first optical route cuts an incomplete via hole leaving a remaining portion of the workpiece, and the second pulse laser beam in the second optical route eliminates the remaining portion to complete the via hole, and a focal distance of the second pulse laser beam as converged through the second condenser lens is less than the focal distance of the first pulse laser beam as converged through the first condenser lens so as to reduce a processable length of the laser beam to the workpiece per pulse.

2. The laser beam processing machine according to claim 1, wherein a NA value of the first condenser lens is 0.01 or less and a NA value of the second condenser lens is 0.02 or more; and $NA \approx r/f$ where r is an area for forming a focal point, and f is the focal length of the condenser lens.

\* \* \* \* \*